(12) United States Patent
Kierbel et al.

(10) Patent No.: US 11,135,793 B2
(45) Date of Patent: Oct. 5, 2021

(54) METHOD FOR FILLING SURFACE IMPERFECTIONS IN AN AIRCRAFT WING

(71) Applicants: Airbus Operations SAS, Toulouse (FR); Airbus SAS, Blagnac (FR)

(72) Inventors: Daniel Kierbel, Toulouse (FR); Mathias Farouz-Fouquet, Toulouse (FR); Laurent Malard, Toulouse (FR)

(73) Assignees: AIRBUS OPERATIONS SAS, Toulouse (FR); AIRBUS SAS, Blagnac (FR)

( * ) Notice: Subject to any disclaimer, the term of this patent is extended or adjusted under 35 U.S.C. 154(b) by 370 days.

(21) Appl. No.: 16/165,220

(22) Filed: Oct. 19, 2018

(65) Prior Publication Data

US 2019/0118497 A1 Apr. 25, 2019

(30) Foreign Application Priority Data

Oct. 23, 2017 (FR) ...................... 1759967

(51) Int. Cl.
*B29C 73/10* (2006.01)
*B64F 5/00* (2017.01)
(Continued)

(52) U.S. Cl.
CPC .......... *B29C 73/10* (2013.01); *B29C 63/0065* (2013.01); *B29C 64/10* (2017.08);
(Continued)

(58) Field of Classification Search
CPC ......... B29C 73/10; B29C 73/14; B29C 73/12; B29C 64/393; B29C 64/10;
(Continued)

(56) References Cited

U.S. PATENT DOCUMENTS 4,225,372 A * 9/1980 Kinzler ................... B64C 21/10
156/154
6,174,392 B1 1/2001 Reis
(Continued)

FOREIGN PATENT DOCUMENTS

EP 3095595 A1 11/2016
FR 3022527 A1 12/2015

OTHER PUBLICATIONS

'Viscosity Tables' (Year: 2005).*
'Heat Shrink Wrap' (Year: 2013).*
French Search Report; priority document.

*Primary Examiner* — Michael N Orlando
*Assistant Examiner* — Abhishek A Patwardhan
(74) *Attorney, Agent, or Firm* — Greer, Burns & Crain, Ltd.

(57) ABSTRACT

A filling method for filling surface imperfections on a surface of a wing comprising a scanning step in which a control unit controls a movement of a scanner past the surface of the wing to scan the surface and transmit the collected data to the control unit, a computation step in which the control unit computes a digitized surface from the data, a determination step in which the control unit determines each surface imperfection by comparing the reference surface and the digitized surface, a generation step in which the control unit generates a digital model of the patch intended to fill the surface imperfection, and a printing step in which the control unit controls the movement of a 3D printer past each surface imperfection and commands the activation of the 3D printer in order to make it print the patch.

18 Claims, 2 Drawing Sheets

(51) Int. Cl.
- *B29C 73/12* (2006.01)
- *G05B 19/18* (2006.01)
- *B33Y 10/00* (2015.01)
- *B33Y 40/00* (2020.01)
- *B33Y 50/02* (2015.01)
- *B29C 64/393* (2017.01)
- *B29C 64/10* (2017.01)
- *B29C 63/00* (2006.01)
- *B29L 31/30* (2006.01)
- *B33Y 70/00* (2020.01)
- *B33Y 80/00* (2015.01)
- *B29K 55/02* (2006.01)
- *B29K 67/00* (2006.01)

(52) U.S. Cl.
CPC ............ *B29C 64/393* (2017.08); *B29C 73/12* (2013.01); *B33Y 10/00* (2014.12); *B33Y 40/00* (2014.12); *B33Y 50/02* (2014.12); *B64F 5/00* (2013.01); *G05B 19/18* (2013.01); *B29K 2055/02* (2013.01); *B29K 2067/046* (2013.01); *B29L 2031/3085* (2013.01); *B33Y 70/00* (2014.12); *B33Y 80/00* (2014.12)

(58) Field of Classification Search
CPC ... B29C 63/0065; B29C 64/106; B29C 73/30; B64F 5/00; B64F 5/40; G05B 19/18; B33Y 10/00; B33Y 40/00; B33Y 50/02; B33Y 70/00; B33Y 80/00; B29K 2055/02; B29K 2067/046; B29L 2031/3085

See application file for complete search history.

(56) References Cited

U.S. PATENT DOCUMENTS

| | | | |
|---|---|---|---|
| 9,827,716 B2 | 11/2017 | Laudrain | |
| 2008/0281554 A1 | 11/2008 | Cork et al. | |
| 2012/0094099 A1* | 4/2012 | Hong | B23P 6/007 428/213 |
| 2015/0090392 A1* | 4/2015 | Bertrand | G05B 19/401 156/64 |
| 2015/0203217 A1 | 7/2015 | Urban | |
| 2015/0367579 A1* | 12/2015 | Laudrain | B29C 64/393 700/98 |
| 2016/0339652 A1 | 11/2016 | Safai et al. | |
| 2016/0368134 A1 | 12/2016 | Hafenrichter et al. | |
| 2018/0193870 A1* | 7/2018 | Ngo | B05C 1/06 |

* cited by examiner

METHOD FOR FILLING SURFACE IMPERFECTIONS IN AN AIRCRAFT WING

CROSS-REFERENCES TO RELATED APPLICATIONS

This application claims the benefit of the French patent application No. 1759967 filed on Oct. 23, 2017, the entire disclosures of which are incorporated herein by way of reference.

BACKGROUND OF THE INVENTION

The present invention relates to a filling method which is intended for filling the surface imperfections in a wing of an aircraft, to an aircraft wing the recesses in which have been filled by such a method and to an aircraft comprising at least one such wing.

During its manufacture or during the course of its life, the surface of a wing of an aircraft may happen to exhibit surface imperfections. The presence of these surface imperfections may disturb the flow of the air over the surface and this flow may then become turbulent.

The appearance of a turbulent flow may lead to additional fuel consumption.

At the present time, there is no simple method for filling these surface imperfections and it is therefore necessary to find a method which allows these surface imperfections to be filled.

SUMMARY OF THE INVENTION

One object of the present invention is to propose a filling method which is intended for filling surface imperfections in a wing of an aircraft.

To this end the invention proposes a filling method for filling surface imperfections on a surface of a wing of an aircraft, the filling method comprising:
- a scanning step during which a control unit controls a first movement system so as to move a scanner past the surface of the wing that is to be filled and commands the activation of the scanner which scans the surface and transmits the collected data to the control unit,
- a computation step during which the control unit computes a digitized surface from the data thus transmitted,
- a determination step during which the control unit determines each surface imperfection by comparing the reference surface and the digitized surface,
- a generation step during which the control unit generates, for each surface imperfection, a digital model of the patch intended to fill the surface imperfection, and
- a printing step during which the control unit controls a second movement system so as to move a 3D printer past each surface imperfection that is to be filled and commands the activation of the 3D printer in order to make it print the patch into the surface imperfection from the digital model thus generated.

Such a method thus makes it possible simply and quickly to fill the surface imperfections in a wing of an aircraft.

In order to encourage the patch to stick, the filling method comprises a preparation step prior to the printing step, during which step a primer is applied to the surface of the wing that is to be filled.

Advantageously, the printing step is followed by a smoothing step during which a top coat having surface characteristics compatible with laminar flow of the air is sprayed over each patch.

According to one particular embodiment, the printing step, or the smoothing step if present, is followed by a covering step during which a heat-shrink film is applied to the surface of the wing that has had the patches applied.

According to one particular embodiment, the printing step, or the smoothing step if present, is followed by a covering step during which a low-viscosity paint is applied to the surface of the wing that has had the patches applied.

According to one particular embodiment, the filling method comprises, prior to the scanning step, a shaping step during which the wing is subjected to a vertical load factor of 1 g, and, between the scanning step and the printing step, a release step during which the wing is returned to a load factor of 0 g.

According to one particular embodiment, the filling method comprises, prior to the scanning step, a shaping step during which the wing is subjected to a vertical load factor of 1 g, and, after the printing step, a release step during which the wing is returned to a load factor of 0 g.

The invention also proposes a wing of an aircraft comprising at least one surface imperfection filled by a patch determined by a filling method according to one of the preceding variants.

The invention also proposes an aircraft comprising at least one wing according to the preceding variant.

BRIEF DESCRIPTION OF THE DRAWINGS

The abovementioned features of the invention, together with others, will become more clearly apparent from reading the following description of one exemplary embodiment, the description being given in conjunction with the attached drawings among which.

DETAILED DESCRIPTION OF THE PREFERRED EMBODIMENTS

Figure 1:
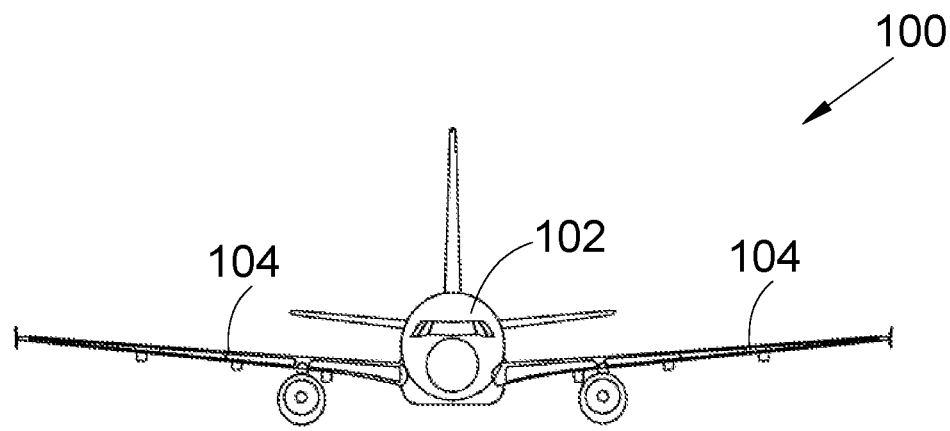
FIG. 1 is a partial face-on view of an aircraft comprising a wing treated using a filling method according to the invention.

FIG. 1 shows an aircraft 100 which comprises a fuselage 102 on each side of which a wing 104 is attached.

Figure 2:
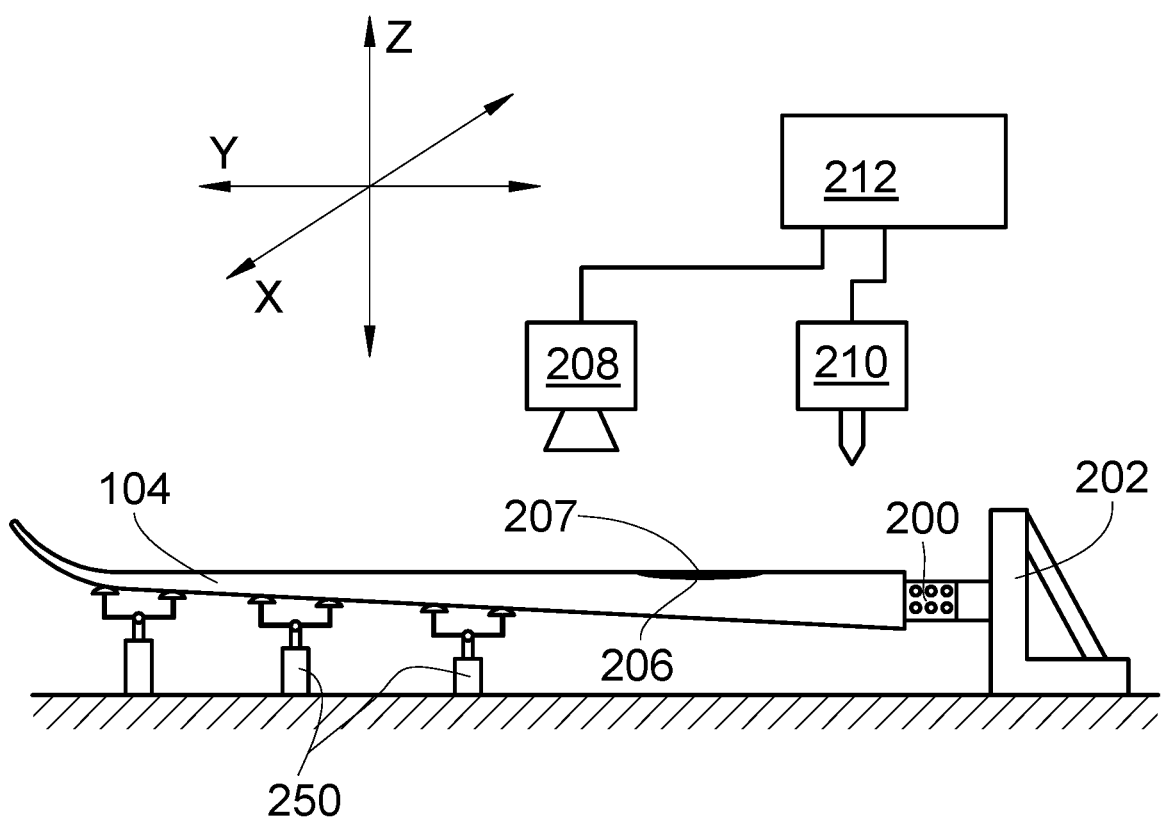
FIG. 2 shows an aircraft wing while it is being treated by implementation of the method according to the invention.

FIG. 2 shows the wing 104 which is fixed by its root 200 to a chassis 202 which is itself fixed to the ground. In order to ensure better stability for the wing 104, stays 250, which rest against the ground, are placed under the wing 104 so that the wing 104 rests on these stays 250.

The surface of the wing 104 exhibits at least one surface imperfection 206 such as a recess or dip which is filled by a patch 207, the geometry of which is determined by a filling method described hereinbelow.

In general, the filling of surface imperfections 206 comprises scanning the surface of the wing 104 so as to obtain a digitized surface, in comparing the surface thus digitized against a reference surface in order therefrom to deduce the differences, namely the surface imperfections present on the digitized surface, and then, using a 3D printer, in applying a patch 207 directly to the surface of the wing 104 so as to fill the surface imperfections thus deduced. The reference surface corresponds to a mockup or digital model of an object considered, in this instance the wing 104. The reference surface is recorded in a database. In general, a digital model is a cloud of points, in which each point is associated with its position in space within a given frame of reference. Initially, the reference surface is the surface of the wing 104 under a load factor of 0 g computed by structure modelling software.

In order to perform this filling of the surface imperfections 206, a scanner 208 and a 3D printer 210 are used. The 3D printer 210 is a machine which allows components to be manufactured by the addition or agglomeration of material.

The scanner 208 is mounted on a first movement system which makes the scanner 208 move in directions that allow it to overfly the surface of the wing 104 to be scanned, in this instance the upper wing surface. The first movement system thus brings about at least one first movement in a longitudinal direction Y of the wing 104 and a second movement in a transverse direction X of the wing 104, in which these two directions X and Y are different and coplanar and preferably perpendicular. The first movement system thus overall takes the form of a travelling crane with two directions of travel.

Of course, if necessary, it is possible to make provision for the first movement system to provide a third movement in a heightwise direction Z corresponding to the distance of the scanner 208 from the wing 104. The first movement system then takes the overall form of a travelling crane with three directions of travel.

According to a second embodiment, the scanner 208 may be mounted fixedly above the wing, the first movement system allowing the acquisition angle of the scanner to be oriented so as to cover the entirety of the wing.

Likewise, the 3D printer 210 is mounted on a second movement system which provides the movement of the 3D printer 210 in directions allowing it to overfly the surface that is to be filled. The second movement system thus provides a first movement along the longitudinal direction Y of the wing 104, a second movement in the transverse direction X of the wing 104, in which these two directions X and Y are different and coplanar and preferably perpendicular, and a third movement in the heightwise direction Z corresponding to the distance of the 3D printer 210 from the wing 104. The second movement system therefore overall adopts the form of a travelling crane with three directions of travel. In a variant, the second movement system may take the form of a six-axis articulated robot with a print head.

The first and second movement systems have not been depicted but they have structures known to those skilled in the art and for example comprise rails, motors, etc.

The first and second movement systems, as well as the scanner 208 and the 3D printer 210 are controlled by a control unit 212 which, for example, takes the form of a computer. During control of the first and second systems, the control unit 212 knows the precise positions of the scanner 208 and of the 3D printer 210 with respect to a frame of reference connected with the wing 104 which is fixed to the chassis 202. Thus, the data collected by the scanner 208 allow the surface of the wing 104 that is to be filled to be mapped with respect to this frame of reference and the position of the patch 207 is determined with respect to this frame of reference.

The control unit 212 is designed to control the movement of the scanner 208 via control of the first movement system, in order to receive data from the scanner 208, to generate a digitized surface from these data, to retrieve a reference surface corresponding to the wing without surface imperfections, to compare the digitized surface and the reference surface, to deduce the surface imperfections 206 from this, to control the movement of the 3D printer 210 via control of the second movement system, and to control the production, by the 3D printer 210, of a patch 207 applied directly to the surface of the wing 104 to fill the surface imperfection 206.

Figure 3:
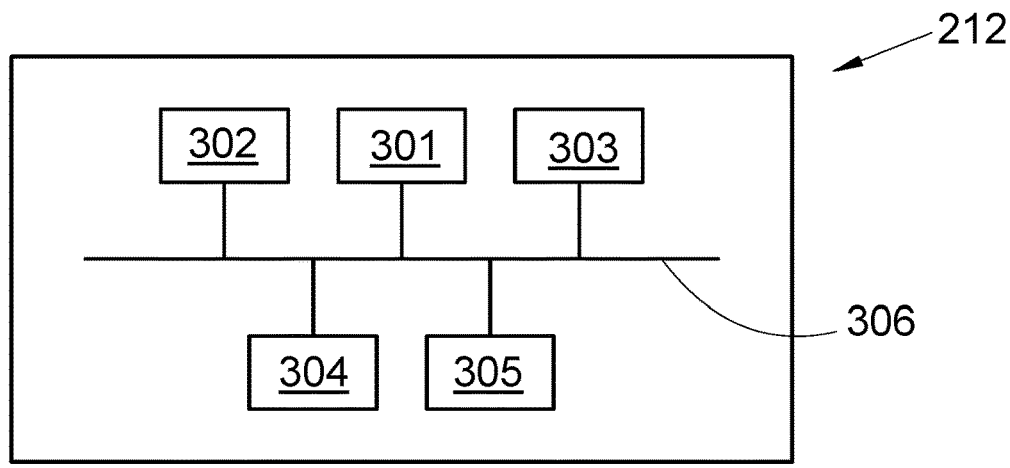
FIG. 3 depicts the architecture of a control unit intended to implement the filling method according to the invention.

FIG. 3 shows the control unit 212 which comprises, connected by a communication bus 306: a processor 301 or CPU ("Central Processing Unit"); a RAM ("Random Access Memory") 302; a ROM ("Read Only Memory") 303; a storage unit such as a hard disk; at least one communications interface 305 for example allowing the control unit 212 to communicate with the scanner 208, the 3D printer 210 and the motors of the first and second movement systems.

The reference surface is stored, for example, in the storage unit 304.

The processor is capable of executing instructions loaded into the RAM from the ROM, from an external memory (not depicted), from a storage medium (such as an SD card) or from a communications network. When power is applied to the equipment, the processor is capable of reading instructions from the RAM and executing them. These instructions form a computer program causing the processor to implement all or some of the algorithms and steps described in connection with FIG. 4.

All or some of the algorithms and steps described hereinafter can be implemented in software form by having a programmable machine, for example a DSP (Digital Signal Processor) or a microcontroller execute a collection of instructions, or may be implemented in hardware form by a dedicated machine or component, for example an FPGA (Field-Programmable Gate Array) or an ASIC (Application-Specific Integrated Circuit).

Figure 4:
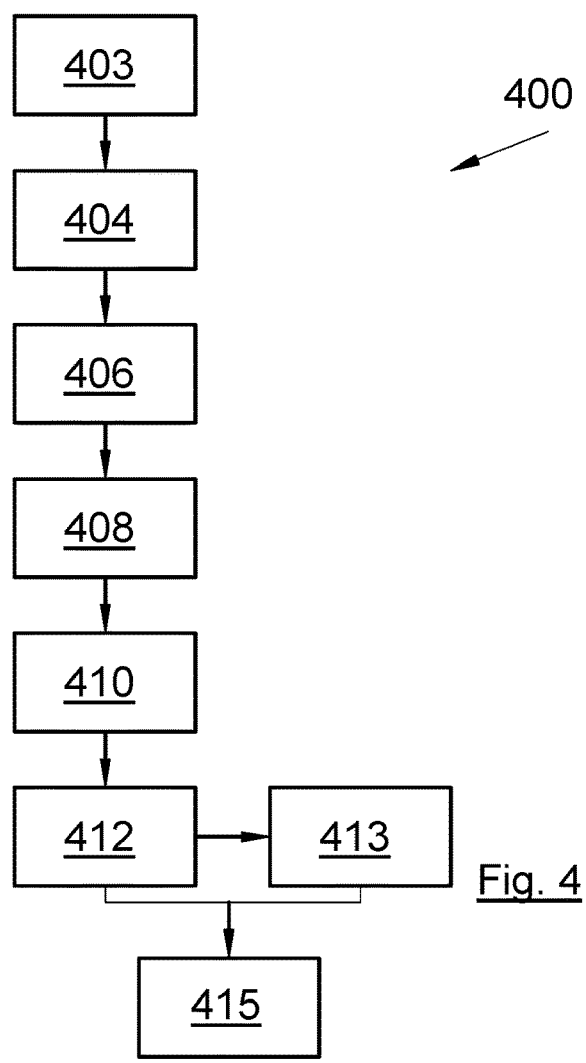
FIG. 4 depicts a block diagram of the filling method according to the invention.

FIG. 4 shows the block diagram 400 for a filling method according to the invention, and which comprises:
- a scanning step 404 during which the control unit 212 controls the first movement system so as to move the scanner 208 past the surface of the wing 104 that is to be filled and commands the activation of the scanner 208 which scans the surface and transmits the collected data to the control unit 212,
- a computation step 406 during which the control unit 212 computes a digitized surface from the data thus transmitted,
- a determination step 408 during which the control unit 212 determines each surface imperfection 206 by comparing the reference surface with the digitized surface,
- a generation step 410 during which the control unit 212 generates, for each surface imperfection 206, a digital model of the patch 207 intended to fill the surface imperfection 206, and
- a printing step 412 during which the control unit 212 controls the second movement system so as to move the 3D printer 210 past each surface imperfection 206 that is to be filled and commands the activation of the 3D printer 210 in order to make it print the patch 207 into the surface imperfection 206 from the digital model thus generated.

Such a filling method thus allows the surface imperfections 206 in a wing 104 to be filled quickly and simply.

The control unit 212 is therefore arranged to control the first movement system so as to move the scanner 208 past the surface of the wing 104 that is to be filled, to activate the scanner 208 and to collect the data relating to the scanned surface and transmitted by the scanner 208, to compute a digitized surface from the data thus transmitted, to determine each surface imperfection 206 by comparing the reference surface and the digitized surface, to generate, for each surface imperfection 206, a digital model of the patch 207 intended to fill the surface imperfection 206, to control the second movement system so as to move the 3D printer 210 past each surface imperfection 206 that is to be filled and to activate the 3D printer 210 in order to make it print the patch 207 into the surface imperfection 206 from the digital model thus generated.

In order to encourage the adhesion of the patch 207 to the surface imperfection 206 and paint on the rest of the surface, the method comprises a preparation step prior to the printing step 412, during which step a primer is applied to the surface of the wing 104 that is to be filled. The primer is applied by any appropriate means, for example by a painting robot. The primer has, for example, a thickness of the order of 100 µm. The primer is, for example, an epoxy-polyamide two-part substance.

The patch 207 can be made from various materials, such as, for example, from ABS (acrylonitrile butadiene styrene) or PLA (polylactic acid) or other materials.

Each surface imperfection 206 is determined by comparing the digitized surface with the reference surface using methods known to those skilled in the art. The digital model of the patch 207 corresponds to the volume of the surface imperfection 206 as determined from the comparison. For example, when the digitized surface and the reference surface are not identical, their difference creates a volume indicative of the presence of a surface imperfection. On the other hand, when they are identical, the digitized surface and the reference surface can be superimposed and coincide.

In order to reduce the roughnesses resulting from the 3D printing, the printing step 412 is followed by a smoothing step 413 during which a top coat is sprayed over each patch 207. The top coat is a material which, after drying, has surface characteristics compatible with laminar flow of the air, such as an epoxy or acrylic paint. The material of the top coat is, for example, ABS (acrylonitrile butadiene styrene) or PLA (polylactic acid).

In order to improve the surface finish of the wing 104 still further, a heat-shrink film may be applied to the surface of the wing 104. The printing step 412, or the smoothing step 413 if present, is then followed by a covering step 415 during which a heat-shrink film is applied to the surface of the wing 104 that has had the patches 207 applied.

The heatshrink film may be replaced by a low-viscosity paint having a thickness of the order of 100 microns.

Given that, under flight conditions, the wing 104 is subjected to a vertical load factor of 1 g upwards, it may be desirable to subject the wing 104 to such a load factor before scanning it and to fill the surface imperfections 206 in such a way that the surface of the wing 104 is as close as possible to the actual conditions of use.

The filling method then comprises, prior to the scanning step 404, a shaping step 403 during which the wing 104 is subjected to a vertical load factor of 1 g.

The application of the 1 g load factor is achieved by adjusting stays 250 so that they lift the free end of the wing 104 and cause the wing 104 to adopt a shape corresponding to the shape it adopts in flight.

The reference surface is then the surface that corresponds to the surface of the wing under a load factor of 1 g which is computed by structure modelling software.

The stays 250 are adjusted, for example, by the control unit 212 in the form of servocontrol controlling the jacks of each stay 250 where the curvature of the wing 104 is monitored by suitable means, such as, for example, lasers, in order to achieve the curvature corresponding to that of the reference surface.

The control unit 212 is therefore arranged to control the jacks of each stay 250.

According to a first embodiment of the invention, the filling method comprises, between the scanning step 404 and the printing step 412, a release step during which the wing 104 is returned to a load factor of 0 g, and the printing is then performed with the wing 104 in the 0 g position.

According to a second embodiment of the invention, the filling method comprises, after the printing step 412, a release step during which the wing 104 is returned to a load factor of 0 g, and the printing is then performed with the wing 104 in the 1 g position.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A filling method for filling surface imperfections on a surface of a wing of an aircraft, the filling method comprising the steps:
   scanning, by a control unit controlling a first movement system to move a scanner past the surface of the wing that is to be filled and commanding the activation of the scanner which scans the surface and transmits collected data to the control unit,
   computing, by the control unit, a digitized surface from the data thus transmitted,
   determining, by the control unit, each surface imperfection by comparing a reference surface and the digitized surface,
   generating, by the control unit, for each surface imperfection, a digital model of a patch intended to fill the surface imperfection, and
   printing, by the control unit controlling a second movement system to move a 3D printer past each surface imperfection that is to be filled and commanding an activation of the 3D printer to make it print the patch into the surface imperfection from the digital model thus generated,
   further comprising, prior to the scanning step, a shaping step during which the wing is subjected to a vertical load factor of 1g, and further comprising, between the scanning step and the printing step, a release step during which the wing is returned to a load factor of 0g.

2. A filling method for filling surface imperfections on a surface of a wing of an aircraft, the filling method comprising the steps:
   scanning, by a control unit controlling a first movement system to move a scanner past the surface of the wing that is to be filled and commanding the activation of the scanner which scans the surface and transmits collected data to the control unit,
   computing, by the control unit, a digitized surface from the data thus transmitted, determining, by the control unit, each surface imperfection by comparing a reference surface and the digitized surface, generating, by the control unit, for each surface imperfection, a digital model of a patch intended to fill the surface imperfection, and printing, by the control unit controlling a second movement system to move a 3D printer past each surface imperfection that is to be filled and commanding an activation of the 3D printer to make it print the patch into the surface imperfection from the digital model thus generated, further comprising, prior to the scanning step, a shaping step during which the wing is subjected to a vertical load factor of 1g, and further comprising, after the printing step, a release step during which the wing is returned to a load factor of 0g.

3. The filling method according to claim 1, further comprising a preparation step prior to the printing step, during which step a primer is applied to the surface of the wing that is to be filled.

4. The filling method according to claim 1, wherein the printing step is followed by a covering step during which a heat-shrink film is applied to the surface of the wing that has had one or more patches applied.

5. The filling method according to claim 1, wherein the printing step is followed by a covering step during which a paint is applied to the surface of the wing that has had one or more patches applied.

6. The filling method according to claim 1, wherein the printing step is followed by a smoothing step, during which step a top coat having surface characteristics compatible with laminar air flow is sprayed over each patch.

7. The filling method according to claim 6, wherein the smoothing step is followed by a covering step during which a heat-shrink film is applied to the surface of the wing that has had the patches applied.

8. The filling method according to claim 6, wherein the smoothing step is followed by a covering step during which a paint is applied to the surface of the wing that has had the patches applied.

9. A wing of an aircraft comprising at least one surface imperfection filled by a patch determined by a filling method according to claim 1.

10. An aircraft comprising at least one wing according to claim 9.

11. The filling method according to claim 2, further comprising a preparation step prior to the printing step, during which step a primer is applied to the surface of the wing that is to be filled.

12. The filling method according to claim 2, wherein the printing step is followed by a covering step during which a heat-shrink film is applied to the surface of the wing that has had one or more patches applied.

13. The filling method according to claim 2, wherein the printing step is followed by a covering step during which a paint is applied to the surface of the wing that has had one or more patches applied.

14. The filling method according to claim 2, wherein the printing step is followed by a smoothing step, during which step a top coat having surface characteristics compatible with laminar air flow is sprayed over each patch.

15. The filling method according to claim 14, wherein the smoothing step is followed by a covering step during which a heat-shrink film is applied to the surface of the wing that has had the patches applied.

16. The filling method according to claim 14, wherein the smoothing step is followed by a covering step during which a paint is applied to the surface of the wing that has had the patches applied.

17. A wing of an aircraft comprising at least one surface imperfection filled by a patch determined by a filling method according to claim 2.

18. An aircraft comprising at least one wing according to claim 17.

* * * * *